United States Patent [19]
Kiel et al.

[11] 4,311,468
[45] Jan. 19, 1982

[54] PLANET PROJECTION

[75] Inventors: Hans-Jürgen Kiel, Wiegendorf; Gebhard Kühn, Jena-Lobeda, both of German Democratic Rep.

[73] Assignee: Jenoptik Jena G.m.b.H., Jena, German Democratic Rep.

[21] Appl. No.: 179,654

[22] Filed: Aug. 27, 1980

[30] Foreign Application Priority Data

Sep. 10, 1979 [DD] German Democratic Rep. ... 215420

[51] Int. Cl.³ .............................................. G09B 27/00
[52] U.S. Cl. .................................................... 434/286
[58] Field of Search ........................... 353/62; 434/286

[56] References Cited

U.S. PATENT DOCUMENTS

| | | | |
|---|---|---|---|
| 3,074,183 | 1/1963 | Frank | 434/286 |
| 3,382,026 | 5/1968 | Schwesinger et al. | 434/286 X |
| 3,589,035 | 6/1971 | Vickery | 434/286 |
| 4,178,701 | 12/1979 | Sadler | 434/286 |

Primary Examiner—Harland S. Skogquist

[57] ABSTRACT

The invention relates to a planet projecting system for simulating the motions of planets and in particular for visualizing the rotations and the phase changes of the Earth. The planet projecting system comprises two cylindrical image mounts which rotate independently of each other, the curved surface of one cylindrical mount is provided with an image of the planet, the curved surface of the other cylindrical mount carries an image of clouds. Two illumination systems illuminate the two image mounts and via respective means the images are projected upon the dome of a planetarium. The spheric shape of a planet is effected by a distortion optical system inserted into the projection beam.

4 Claims, 1 Drawing Figure

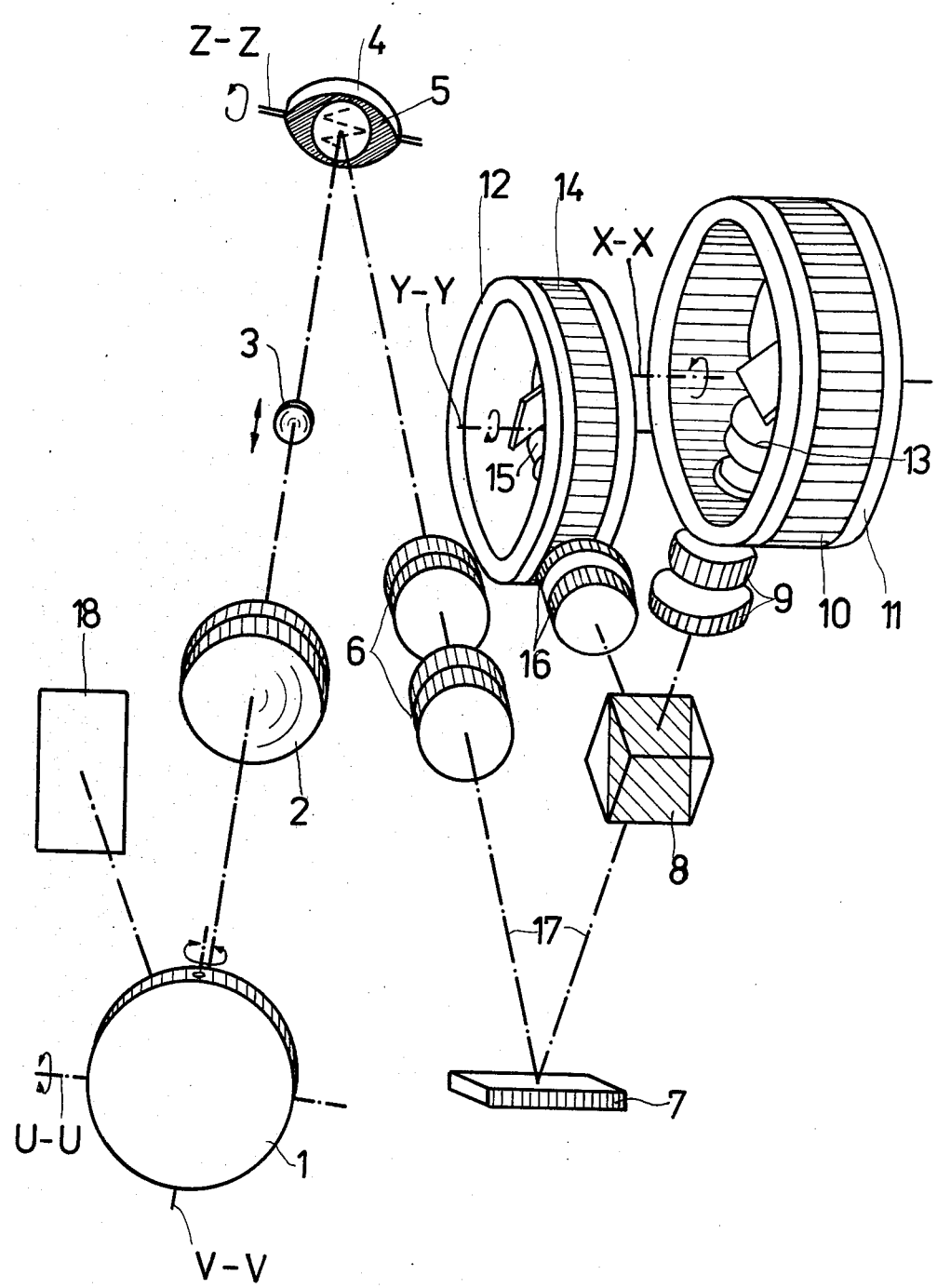

PLANET PROJECTION

The invention relates to an arrangement for planet projection in planetaria for simulating the oscillating motions and the change of phase of the Earth, in particular for visualizing a rotation of the Earth. It is known to simulate the motion of the planets and their phases.

Previous planet projectors provide an image of a planet, in particular of the Earth also showing clouds.

Said projectors are capable to simulate the phase changes and the motions of the planets relative to the stars, it is, however, not feasible to represent the daily rotations of the Earth relative to the stars.

It is an object of the invention to obviate above disadvantages.

It is a further object of the invention to provide a planet projector which simulates substantially all motions of a planet, the daily rotations, the phase changes and the relative motions of the stars, eliminating an unvariable relation of the planet surface to the clouds.

It is still a further object of the invention to provide a planet projector which simulates the motion of a planet such that the impression of a sphere performing daily rotations results and a relative motion between clouds and a planet surface.

These and other objects are realised by a planet projecting system for simulating the motions and phase changes of a planet wherein two photo mounts of cylindrical shape are provided for rotations independently on each other.

The curved surfaces of said mounts carry an image of a planet and an image of clouds, respectively. Each photograph is inserted into a light beam, the projection beams produced by said light beam and originating from said photographs are fused in an optical means after passage through at least one optical distortion system.

Advantageously, the two image mounts rotate with different speeds.

The two poles of the planets rotate on equally long circular paths so that the spherical shape of the images is obtained. The distortion system produces an intermediate image exhibiting barrel distortion by aid of which the spherical shape of the planets is approximated. In order that the invention may be more readily understood reference is made to the accompanying drawing which illustrates diagrammatically and by way of example one embodiment thereof and where the FIGURE is a schematical view of the planet projecting optical arrangement.

Two hollow cylinders 11 and 12 seated for rotations about axes x—x and y—y, respectively, have each curved transparent surfaces where photographs 10 and 14, respectively, are attached to.

The photographs (slides) 10 and 14 are images of a planet and of clouds, respectively.

An illumination system 13 and 15, respectively, provided within the hollow cylinder 11 and 12, respectively, produces respective imaging beams which are fused into one beam 17 by an optical (splitting) cube 8 after passage through an optical distortion system 9 and 16, respectively.

The fused image beam 17 is folded by a reflector 7 and directed through an intermediate imaging system to impinge upon a reflector 5 of a phase calotte 4. The reflector 5 directs the beam 17 through a focusing member 3 via an imaging optical system 2 to a tiltable reflector 1 which projects the beam 17 upon a planetarium dome, of which only a part 18 is shown.

In operation, the illumination system 13 and 15 illuminate the image 10, for example, a slide of a planet surface, and the image 14, for example, a slide of clouds which are both projected into the distortion optical systems 9 and 16, respectively. The latter produces a barrel effect so that the images approximate sphere shape.

Since both cylinders rotate about the axes x—x and y—y, respectively, in such a manner relative to the distortion system 9 and 16 only a small section of the slides 10 and 14 are projected upon the not shown dome.

The splitting cube 8 superimposes both images upon one another. An intermediate image of said slides 10 and 14 is produced in the plane of the reflector 5 by the intermediate imaging system 6.

The calotte 4 seated for rotations about an axis z—z additionally provides the images 10 and 14 with the respective phase changes.

The reflector 1 tiltable about the pivot axes u—u and v—v simulates the relative motion between Earth and moon and can be switched off when other planets' movements are simulated.

We claim:

1. A planet projecting system for simulating the relative motions of a planet in particular to simulate the phase change of the Earth comprising in optical alignment a first and a second illumination system, a first and a second hollow cylinder having a transparent curved surface each, a first transparent photograph representing an image of a planet, a second transparent photograph representing an image of clouds, said first and said second image being attached to said curve face of said first and said second cylinder, respectively, said first and said second illumination system being arranged within said first and said second cylinder, respectively, for producing a first and a second imaging beam, respectively, of said first and said second photograph, respectively, a first and a second optical distortion system for producing a barrel distortion of said first and said second image, a beam splitting cube for focusing said first and said second imaging beam to yield a fused imaging beam, first optical means for directing and imaging said fused imaging beam, a reflecting means, a calotte being arranged for rotations about said reflecting means, second optical means for imaging said fused imaging beam, a reflector, ;p2 a planetarium dome for receiving said fused imaging beam from said reflecting means via said second optical means and said reflector.

2. A planet projecting system as claimed in claim 1, wherein said first and said second hollow cylinder are rotatable about a first and a second optical axis, respectively, being the cylinder axis.

3. A planet projecting system as claimed in claim 1, wherein said reflector is pivotable about two axes being at right angles to each other and substantially perpendicular to said fused imaging beam.

4. A planet projecting system as claimed in claims 1, 2 or 3, wherein said first and said second cylinder perform rotations of different speed relative to each other.

* * * * *